US011330612B2

(12) United States Patent
Xue et al.

(10) Patent No.: US 11,330,612 B2
(45) Date of Patent: May 10, 2022

(54) AUTONOMOUS UPLINK FOR WIDEBAND NEW RADIO-UNLICENSED

(71) Applicant: QUALCOMM Incorporated, San Diego, CA (US)

(72) Inventors: Yisheng Xue, San Diego, CA (US); Aleksandar Damnjanovic, Del Mar, CA (US); Jing Sun, San Diego, CA (US); Xiaoxia Zhang, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 16/738,867

(22) Filed: Jan. 9, 2020

(65) Prior Publication Data

US 2020/0229219 A1 Jul. 16, 2020

Related U.S. Application Data

(60) Provisional application No. 62/792,248, filed on Jan. 14, 2019.

(51) Int. Cl.
*H04W 72/12* (2009.01)
*H04W 16/14* (2009.01)
*H04W 74/08* (2009.01)

(52) U.S. Cl.
CPC ....... *H04W 72/1268* (2013.01); *H04W 16/14* (2013.01); *H04W 74/0808* (2013.01)

(58) Field of Classification Search
CPC ............. H04W 72/1268; H04W 16/14; H04W 74/0808

See application file for complete search history.

(56) References Cited

U.S. PATENT DOCUMENTS 10,231,131 B2 * 3/2019 Zhang ................... H04W 72/10
10,440,731 B2 * 10/2019 Fan ..................... H04W 72/0446
(Continued)

OTHER PUBLICATIONS

Nokia et al: "On channel access for autonomous UL access", 3GPP Draft; R1-1713861 AUL Channel Access, 3rd Generation Partnerdhip Project (3GPP), Mobile Competence Centre; 650, Route Des Lucioles; F-06921 Sophia-Antipolis Cedex; France.*

(Continued)

*Primary Examiner* — Brenda H Pham
(74) *Attorney, Agent, or Firm* — Liem T. Do

(57) ABSTRACT

Autonomous uplink (AUL) for wideband new radio (NR) unlicensed (NR-U) operations is disclosed. For user equipments (UEs) that have been configured for AUL transmissions and have received an activation signal to activate the AUL capabilities, further indications may be used to enable AUL transmissions on AUL transmission opportunities (TxOPs) that overlap the timing of a current TxOP reserved by a serving base station, but that are allocated outside of the resources reserved for the current TxOP. A UE that identifies a desired, next AUL TxOP that overlaps the current base station-initiated TxOP duration, but is allocated for resources outside of the current TxOP resources determines whether it has obtained an enablement indication either directly from the serving base station or implicitly, based on current conditions at the UE. When the UE determines that it has obtained an enabling indication, it may then perform AUL transmissions via the overlapping AUL TxOP.

30 Claims, 10 Drawing Sheets

(56) References Cited

U.S. PATENT DOCUMENTS

| | | | |
|---|---|---|---|
| 10,708,851 B2* | 7/2020 | Karaki | H04W 48/12 |
| 10,772,113 B2* | 9/2020 | Yerramalli | H04L 1/0026 |

OTHER PUBLICATIONS

Broadcom, et al., "Preamble/Initial Signal for NR-Unlicensed", 3GPP Draft, 3GPP TSG RAN WG1 Meeting #95, R1-1813567, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 3, 2018 (Nov. 3, 2018), XP051479905, 6 Pages. Retrieved from the Internet: URL:http://www.3gpp.org/ftp/tsg%5Fran/WG1%5FRL1/TSGR1%5F95/Docs/R1%2D1813567%2Ezip, [retrieved on Nov. 3, 2018], pp. 1-5.

International Search Report and Written Opinion—PCT/US2020/013027—ISA/EPO—Apr. 3, 2020.

Nokia, et al., "On Channel Access for Autonomous UL Access", 3GPP Draft, 3GPP TSG-RAN WG1 Meeting #90, R1-1713861 AUL Channel Access, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 21, 2017-Aug. 25, 2017, Aug. 20, 2017 (Aug. 20, 2017), XP051316655, 5 Pages, Retrieved from the Internet: URL: http://www.3gpp.org/ftp/Meetings_3GPP_SYNC/RAN1/Docs/ [retrieved on Aug. 20, 2017], Section 2.1.

Qualcomm Incorporated: "Channel Access for Autonomous UL Access", 3GPP Draft, 3GPP TSG RAN WG1 #91, R1-1720406 Channel Access for Autonomous UL Access, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017 (Nov. 18, 2017), XP051369969, pp. 1-4, Retrieved from the Internet: URL: http://www.3gpp.org/ftp/tsg%5Fran/WG1%5FRL1/TSGR1%5F91/Docs/, [retrieved on Nov. 18, 2017], the whole document.

* cited by examiner

AUTONOMOUS UPLINK FOR WIDEBAND NEW RADIO-UNLICENSED

CROSS-REFERENCE TO RELATED APPLICATIONS

This application claims the benefit of U.S. Provisional Patent Application No. 62/792,248, entitled, "AUTONOMOUS UPLINK FOR WIDEBAND NR-U," filed on Jan. 14, 2019, which is expressly incorporated by reference herein in its entirety.

BACKGROUND

Field

Aspects of the present disclosure relate generally to wireless communication systems, and more particularly, to autonomous uplink (AUL) for wideband new radio (NR) unlicensed (NR-U) operations.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the $3^{rd}$ Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes receiving, by a user equipment (UE), an activation of configured autonomous uplink (AUL) for the UE, wherein the configured AUL includes a plurality of allocated AUL opportunities, identifying, by the UE, one or more overlapping AUL transmission opportunities (TxOPs) in a shared communication spectrum outside of a set of resources within the shared communication spectrum allocated for a current TxOP of a serving base station, determining, by the UE, a status of an enabling indication for the UE, wherein the enabling indication enables AUL transmissions for the UE outside of the set of resources within the current TxOP, and performing, by the UE, an AUL transmission via the one or more overlapping AUL TxOPs in response successful determination of the enabling indication.

In an additional aspect of the disclosure, a method of wireless communication includes transmitting, by a base station, an activation signal of configured AUL for one or more served UEs, wherein the configured AUL includes a plurality of allocated AUL TxOPs, performing, by the base station, a listen before talk (LBT) procedure on a set of resources within a shared communication spectrum to secure a current TxOP, signaling, by the base station, an enabling indication for the one or more served UEs, wherein the enabling indication enables AUL transmissions outside of the set of resources for the current TxOP, and wherein the AUL transmissions overlap at least a portion of the current TxOP, and receiving, by the base station, one or more AUL transmissions during the current TxOP via one or more AUL TxOPs outside of the set of resources.

In an additional aspect of the disclosure, an apparatus configured for wireless communications includes means for receiving, by a UE, an activation of configured AUL for the UE, wherein the configured AUL includes a plurality of allocated AUL opportunities, means for identifying, by the UE, one or more overlapping AUL TxOPs in a shared communication spectrum outside of a set of resources within the shared communication spectrum allocated for a current TxOP of a serving base station, means for determining, by the UE, a status of an enabling indication for the UE, wherein the enabling indication enables AUL transmissions for the UE outside of the set of resources within the current TxOP, and means for performing, by the UE, an AUL transmission via the one or more overlapping AUL TxOPs in response successful determination of the enabling indication.

In an additional aspect of the disclosure, an apparatus configured for wireless communications includes means for transmitting, by a base station, an activation signal of configured AUL for one or more served UEs, wherein the configured AUL includes a plurality of allocated AUL TxOPs, means for performing, by the base station, a LBT procedure on a set of resources within a shared communication spectrum to secure a current TxOP, means for signaling, by the base station, an enabling indication for the one or more served UEs, wherein the enabling indication enables AUL transmissions outside of the set of resources for the current TxOP, and wherein the AUL transmissions overlap at least a portion of the current TxOP, and means for receiving, by the base station, one or more AUL transmissions during the current TxOP via one or more AUL TxOPs outside of the set of resources.

In an additional aspect of the disclosure, a non-transitory computer-readable medium having program code recorded thereon. The program code further includes code to receive, by a UE, an activation of configured AUL for the UE, wherein the configured AUL includes a plurality of allocated AUL opportunities, code to identify, by the UE, one or more overlapping AUL TxOPs in a shared communication spectrum outside of a set of resources within the shared communication spectrum allocated for a current TxOP of a serving base station, code to determine, by the UE, a status of an enabling indication for the UE, wherein the enabling indication enables AUL transmissions for the UE outside of the set of resources within the current TxOP, and code to perform, by the UE, an AUL transmission via the one or more overlapping AUL TxOPs in response successful determination of the enabling indication.

In an additional aspect of the disclosure, a non-transitory computer-readable medium having program code recorded thereon. The program code further includes code to transmit, by a base station, an activation signal of configured AUL for one or more served UEs, wherein the configured AUL includes a plurality of allocated AUL TxOPs, code to perform, by the base station, a LBT procedure on a set of resources within a shared communication spectrum to secure a current TxOP, code to signal, by the base station, an enabling indication for the one or more served UEs, wherein the enabling indication enables AUL transmissions outside of the set of resources for the current TxOP, and wherein the AUL transmissions overlap at least a portion of the current TxOP, and code to receive, by the base station, one or more AUL transmissions during the current TxOP via one or more AUL TxOPs outside of the set of resources.

In an additional aspect of the disclosure, an apparatus configured for wireless communication is disclosed. The apparatus includes at least one processor, and a memory coupled to the processor. The processor is configured to receive, by a UE, an activation of configured AUL for the UE, wherein the configured AUL includes a plurality of allocated AUL opportunities, to identify, by the UE, one or more overlapping AUL TxOPs in a shared communication spectrum outside of a set of resources within the shared communication spectrum allocated for a current TxOP of a serving base station, to determine, by the UE, a status of an enabling indication for the UE, wherein the enabling indication enables AUL transmissions for the UE outside of the set of resources within the current TxOP, and to perform, by the UE, an AUL transmission via the one or more overlapping AUL TxOPs in response successful determination of the enabling indication.

In an additional aspect of the disclosure, an apparatus configured for wireless communication is disclosed. The apparatus includes at least one processor, and a memory coupled to the processor. The processor is configured to transmit, by a base station, an activation signal of configured AUL for one or more served UEs, wherein the configured AUL includes a plurality of allocated AUL TxOPs, to perform, by the base station, a LBT procedure on a set of resources within a shared communication spectrum to secure a current TxOP, to signal, by the base station, an enabling indication for the one or more served UEs, wherein the enabling indication enables AUL transmissions outside of the set of resources for the current TxOP, and wherein the AUL transmissions overlap at least a portion of the current TxOP, and to receive, by the base station, one or more AUL transmissions during the current TxOP via one or more AUL TxOPs outside of the set of resources.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
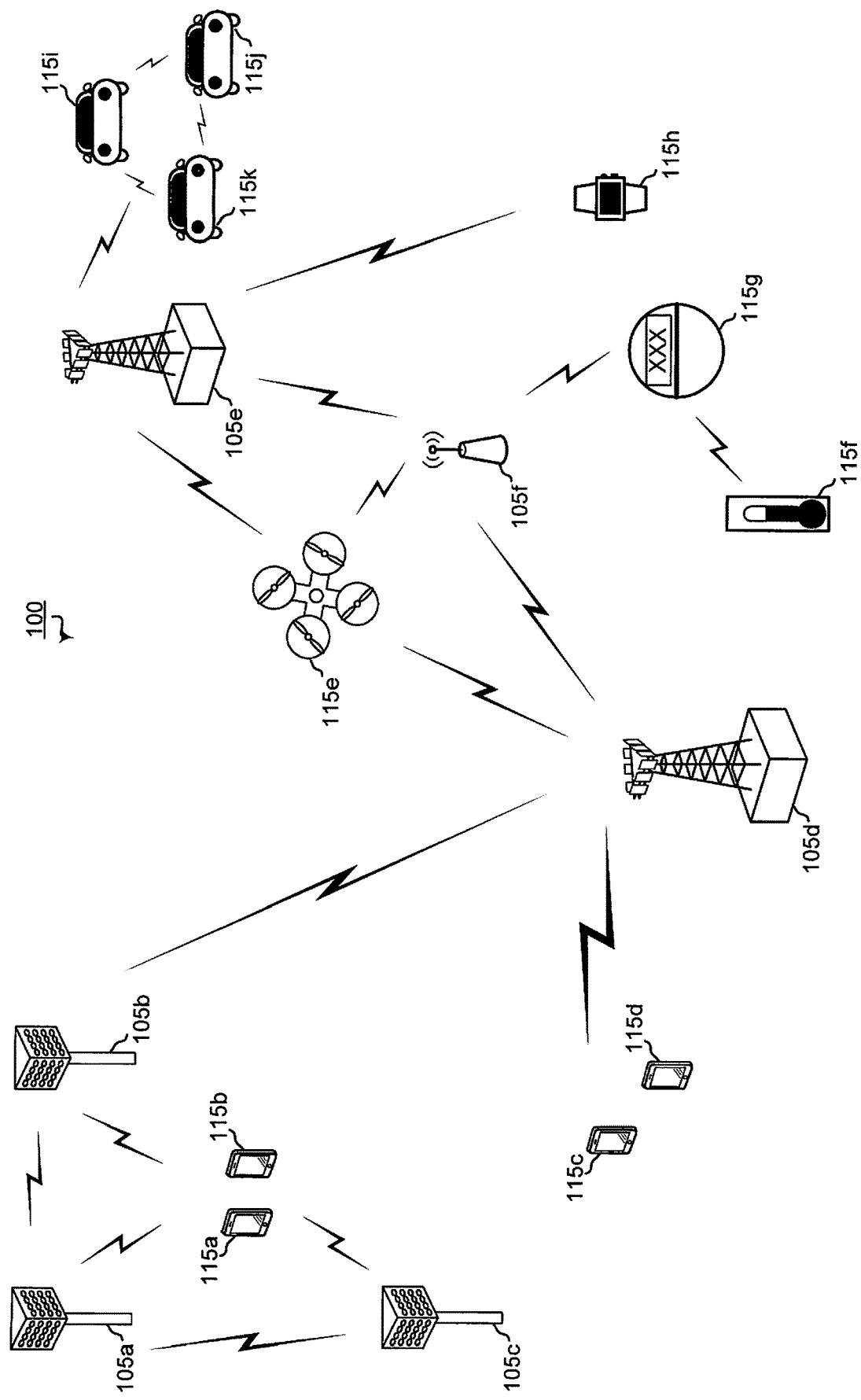
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "$3^{rd}$ Generation Partnership Project" (3GPP), and cdma2000 is described in documents from an organization named "$3^{rd}$ Generation Partnership Project 2" (3GPP2). These various radio technologies and standards are known or are being developed. For example, the $3^{rd}$ Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105$d$ and 105$e$ are regular macro base stations, while base stations 105$a$-105$c$ are macro base stations enabled with one of 3 dimension (3D), full dimension (FD), or massive MIMO. Base stations 105$a$-105$c$ take advantage of their higher dimension MIMO capabilities to exploit 3D beamforming in both elevation and azimuth beamforming to increase coverage and capacity. Base station 105$f$ is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115$a$-115$d$ are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115$e$-115$k$ are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105$a$-105$c$ serve UEs 115$a$ and 115$b$ using 3D beamforming and coordinated spatial techniques, such as coordinated multipoint (CoMP) or multi-connectivity. Macro base station 105$d$ performs backhaul communications with base stations 105$a$-105$c$, as well as small cell, base station 105$f$. Macro base station 105$d$ also transmits multicast services which are subscribed to and received by UEs 115$c$ and 115$d$. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115$e$, which is a drone. Redundant communication links with UE 115$e$ include from macro base stations 105$d$ and 105$e$, as well as small cell base station 105$f$. Other machine type devices, such as UE 115$f$ (thermometer), UE 115$g$ (smart meter), and UE 115$h$ (wearable device) may communicate through 5G network 100 either directly with base stations, such as small cell base station 105$f$, and macro base station 105$e$, or in multi-hop configurations by communicating with another user device which relays its information to the network, such as UE 115$f$ communicating temperature measurement information to the smart meter, UE 115$g$, which is then reported to the network through small cell base station 105$f$. 5G network 100 may also provide additional network efficiency through dynamic, low-latency TDD/FDD communications, such as in a vehicle-to-vehicle (V2V) mesh network between UEs 115$i$-115$k$ communicating with macro base station 105$e$.

Figure 2:
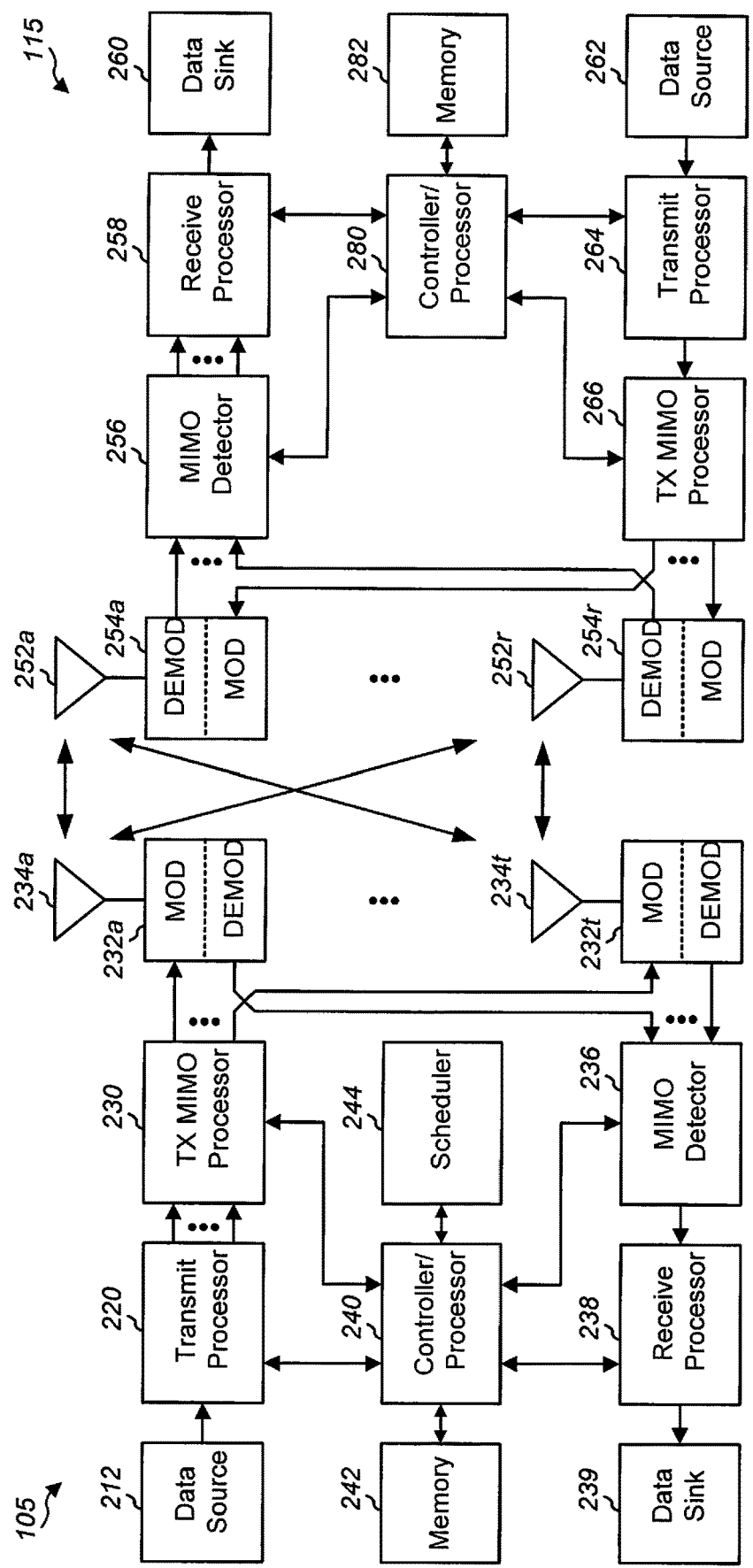
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232$a$ through 232$t$. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232$a$ through 232$t$ may be transmitted via the antennas 234$a$ through 234$t$, respectively.

At the UE 115, the antennas 252$a$ through 252$r$ may receive the downlink signals from the base station 105 and may provide received signals to the demodulators (DEMODs) 254$a$ through 254$r$, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 5A and 5B, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
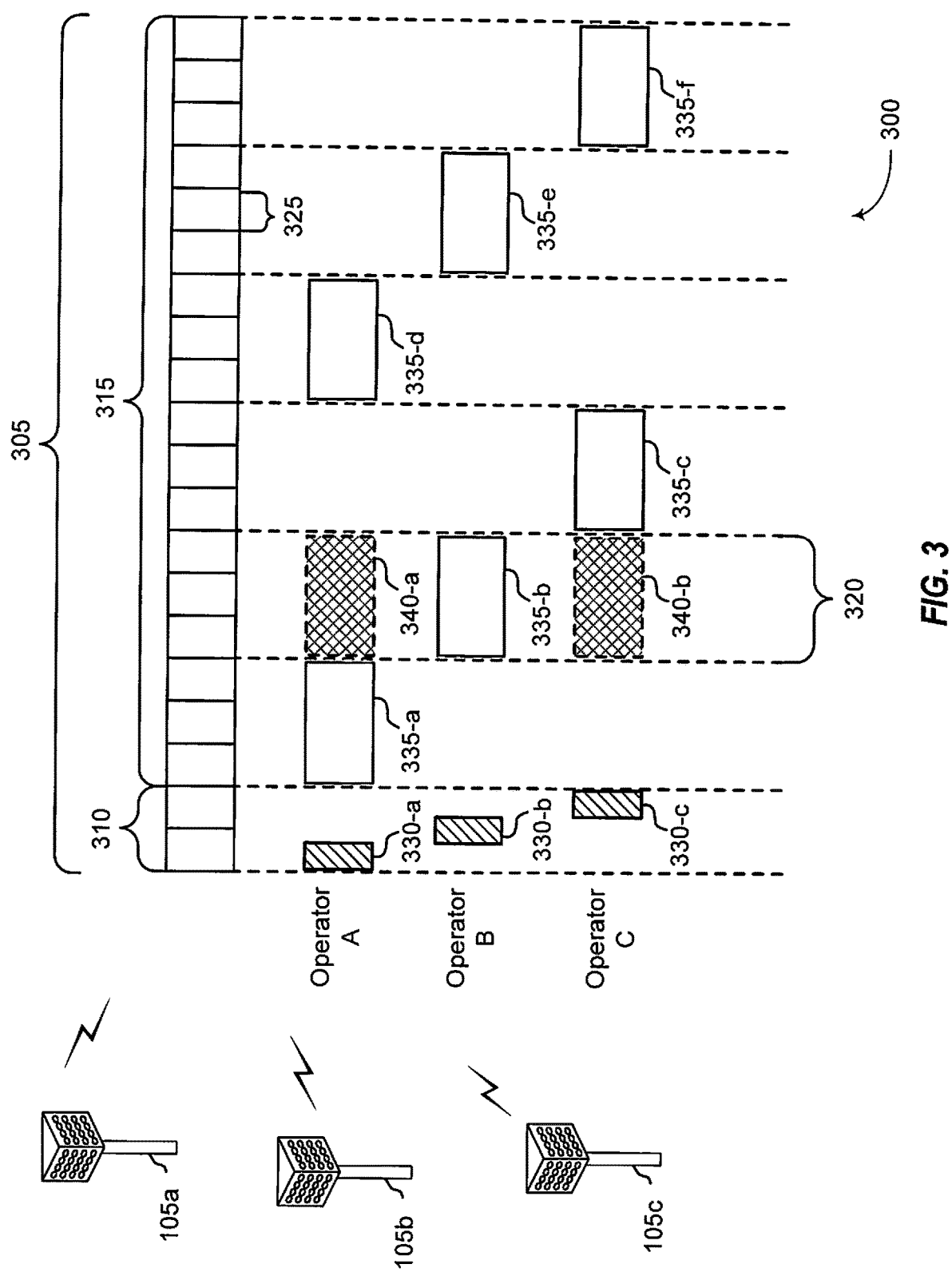
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-*a* may be reserved for exclusive communications by Operator A, such as through base station 105*a*, resources 330-*b* may be reserved for exclusive communications by Operator B, such as through base station 105*b*, and resources 330-*c* may be reserved for exclusive communications by Operator C, such as through base station 105*c*. Since the resources 330-*a* are reserved for exclusive communications by Operator A, neither Operator B nor Operator C can communicate during resources 330-*a*, even if Operator A chooses not to communicate during those resources. That is, access to exclusive resources is limited to the designated network operator. Similar restrictions apply to resources 330-*b* for Operator B and resources 330-*c* for Operator C. The wireless nodes of Operator A (e.g, UEs 115 or base stations 105) may communicate any information desired during their exclusive resources 330-*a*, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-*a* may be prioritized for use by Operator A and may therefore be referred to as a G-INT for Operator A (e.g., G-INT-OpA). Similarly, resources 335-*b* may be prioritized for Operator B (e.g., G-INT-OpB), resources 335-*c* may be prioritized for Operator C (e.g., G-INT-OpC), resources 335-*d* may be prioritized for Operator A, resources 335-*e* may be prioritized for Operator B, and resources 335-*f* may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-*a* and resources 335-*b*), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT (e.g., resources 335-*b*), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-*b* (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with an uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within the superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of the superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

With the introduction of contention-based sharing of communication spectrum in which network nodes desiring to transmit on the shared communication spectrum first successfully complete some level of listen before talk (LBT) procedure, the medium access control (MAC) efficiency of scheduled uplink (SUL) communications has seen a reduction, as SUL includes both successful extended clear channel assessment (ECCA) of a base station and successful CCA of the UE scheduled for transmission. The MAC efficiency has been observed to be lower also than WiFi un-scheduled uplink (e.g., 802.11ac). The concept of autonomous uplink (AUL) communications was introduced in response to the reduced efficiency of SUL in such shared communication spectrum operations. Without first completing the scheduling request/grant procedure, AUL transmissions offer lower latency as compared to SUL transmissions.

In NR-U operations, wideband communications may be available with allocated channel bandwidths up to 100 MHz. However, in order to co-exist with WiFi networks over the same spectrum, NR-U defines 20 MHz as the basic LBT granularity. Thus, NR-U networks having a >20 MHz channel bandwidth may be divided into multiple 20 MHz sub-bands. Any such 20 MHz subband may be used for communications after a successful LBT procedure. The resulting set of successfully reserved subbands or portion of the channel bandwidth becomes a transmission opportunity (TxOP) for the reserving base station. An energy detection (ED) LBT-based AUL has been suggested for each 20 MHz channel having configured AUL resources.

AUL may be configured using semi-static signaling, such as radio resource control (RRC) signaling. AUL configuration includes allocating multiple AUL opportunities across the multiple channels/subbands of the channel bandwidth. UEs receive the AUL configuration and wait to further receive an AUL activation via dynamic signaling, such as downlink control information (DCI) signaling. Once activated, the UE may attempt AUL transmissions during the configured AUL transmission opportunities. An AUL UE can compete for any configured AUL opportunities overlapping the base station TxOP that are outside of the portion of the channel bandwidth reserved for the serving base station TxOP by using a full LBT procedure (e.g., category-4 LBT). Where an AUL opportunity has been configured within the resources reserved for the base station TxOP, the AUL UE may compete for the spectrum using an abbreviated LBT procedure (e.g., category-2 LBT, 25 μs LBT).

Figure 4:
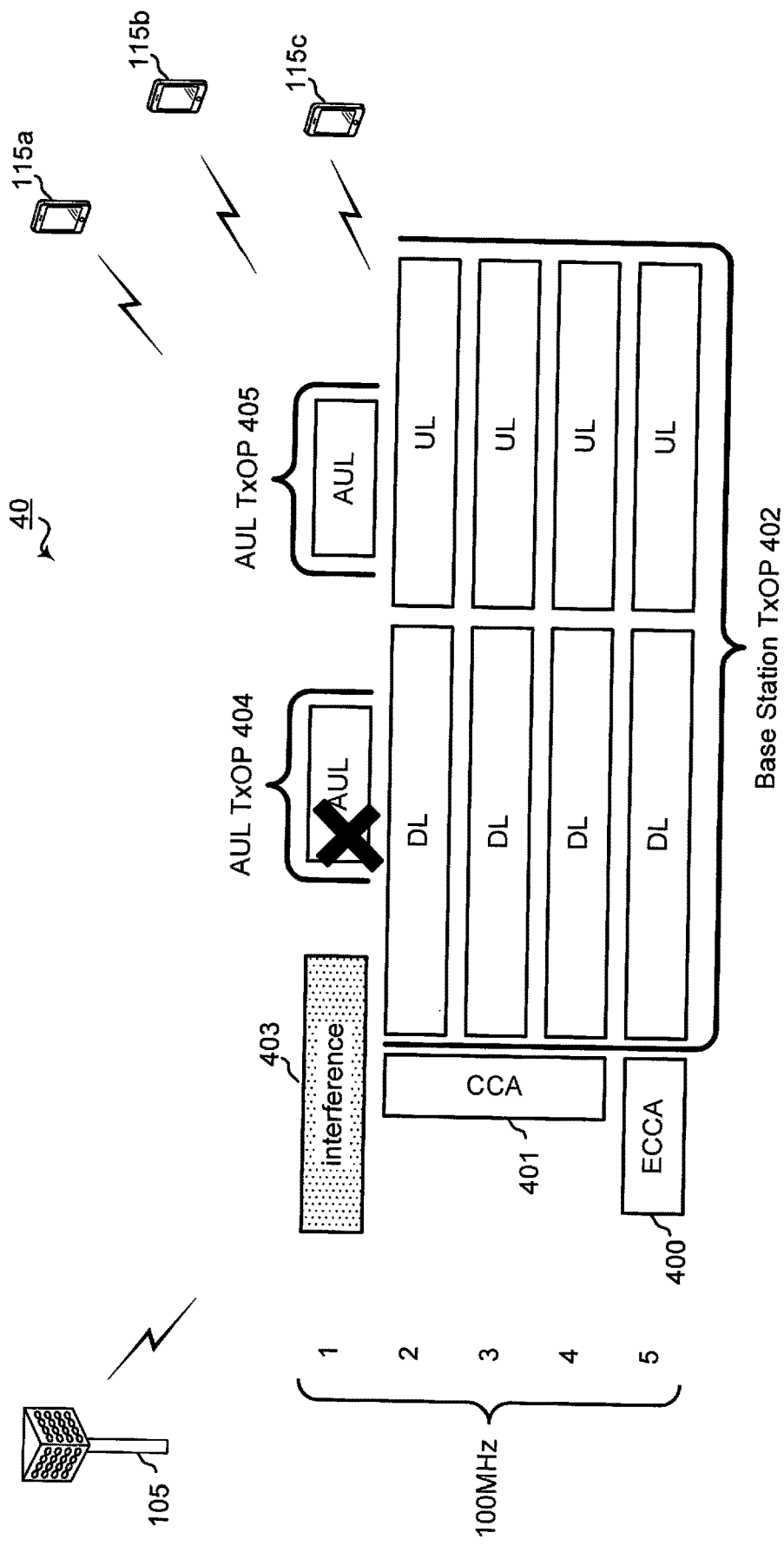
FIG. 4 is a block diagram illustrating an NR-U network having a multi-channel deployment of shared communication spectrum.

FIG. 4 is a block diagram illustrating an NR-U network 40 having a multi-channel deployment of shared communication spectrum. Base station 105 has been allocated a channel bandwidth of 100 MHz, divided into five 20 MHz subbands (1-5). Handling of multi-channel LBT in NR-U operations has been defined according to multi-channel LBT in LTE-LAA operations. A primary LBT channel is defined and may be used flexibly, such that base station 105 can dynamically change the primary LBT channel every 1-sec without announcing the change in over-the-air (OTA) signaling. As illustrated, base station 105 desires to conduct communication and performs an LBT procedure on the channel bandwidth. For example, base station 105 performs ECCA 400 on its primary channel, subband 5, and performs CCA 400 on subbands 1-4. Base station 105 successfully completes ECCA 400 and CCA 400 on subbands 2-4, and, thus, reserves TxOP 402 for its communications.

AUL TxOPs 404 and 405 have been configured/activated on subband 1, which overlap with TxOP 402 of base station 105. Base station 105 serves UEs 105a-105c. Any of UEs 105a-105c can be power limited or/and low-RF-capable with the ability to monitor only a single subband. In order to successfully complete AUL transmissions, using a full LBT procedure (e.g., category-4 LBT) only may not guarantee successful AUL transmissions. For example, considering interference 403, which may include interference from potential downlink transmissions from base station 105 during the downlink portions of TxOP, UEs 105a-105c may not pass the LBT procedure for AUL TxOP 404. Thus, AUL transmissions would fail for AUL TxOP 404.

One solution that has been suggested to address such difficulties provides for the base station to always switch to receiving mode for each activated configured AUL TxOP, thus, treating any possible AUL TxOP as a SUL TxOP that has been scheduled outside of the base station TxOP resources. However, in such a suggested solution, the increased efficiencies of AUL capability may be diminished and can lead to a reduced number of base station-initiated TxOPs. One suggested solution to this issue of reduced number of base station-initiated TxOP is to cluster AUL TxOPs in the time domain and provide for the base station to switch to receiving mode around each cluster, and not simply each individual AUL. However, AUL efficiencies tend to be maximized with as multiple distributed AUL resources to better exploit burst interference and to provide more availability for arriving uplink traffic. Various aspects of the present disclosure are directed to AUL TxOP overlapping with base station TxOP that are outside of the resources reserved for the base station TxOP that may be enabled in response to an enabling indication.

Figure 5:
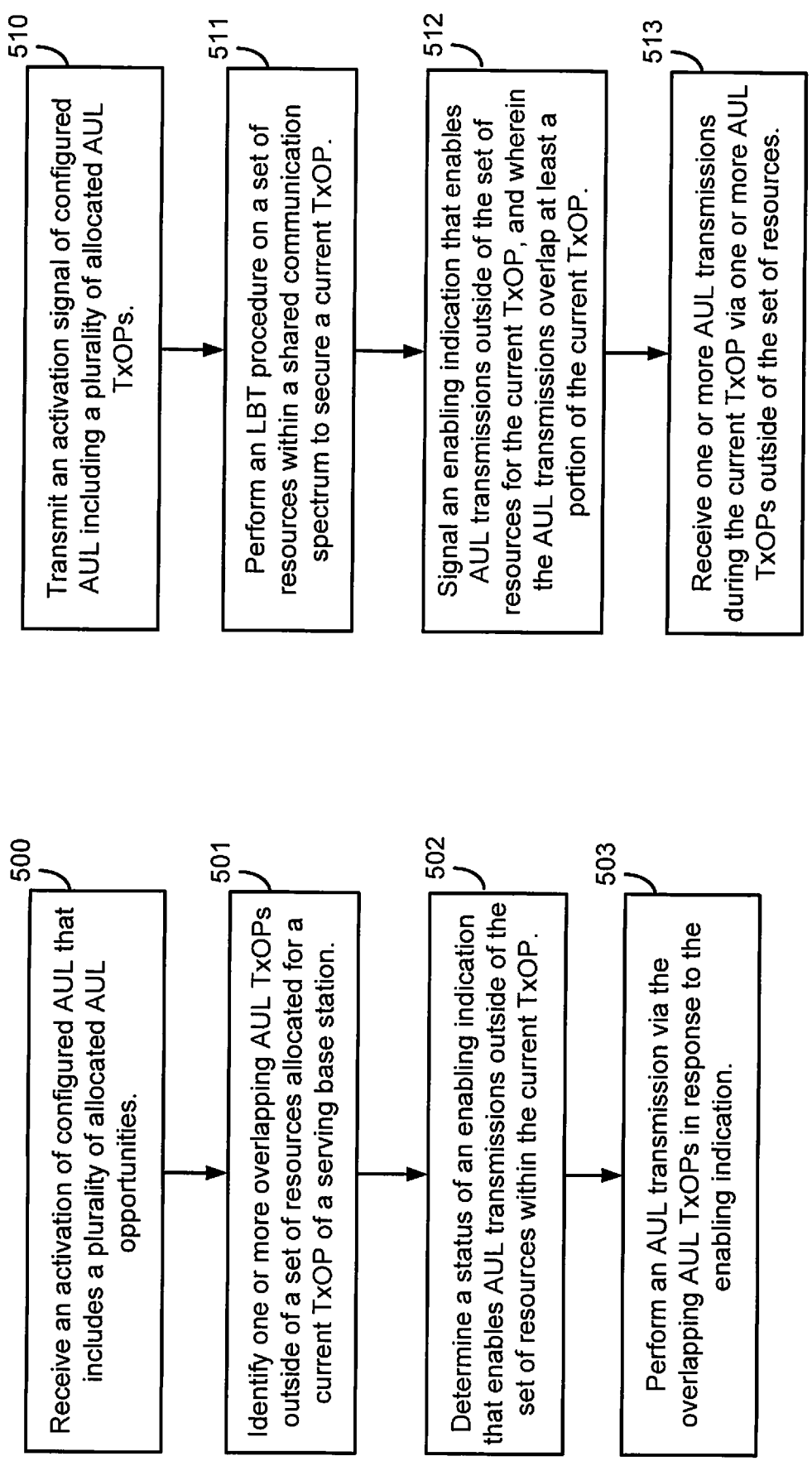
FIGS. 5A and 5B are block diagrams illustrating example blocks executed to implement one aspect of the present disclosure.
Figure 9:
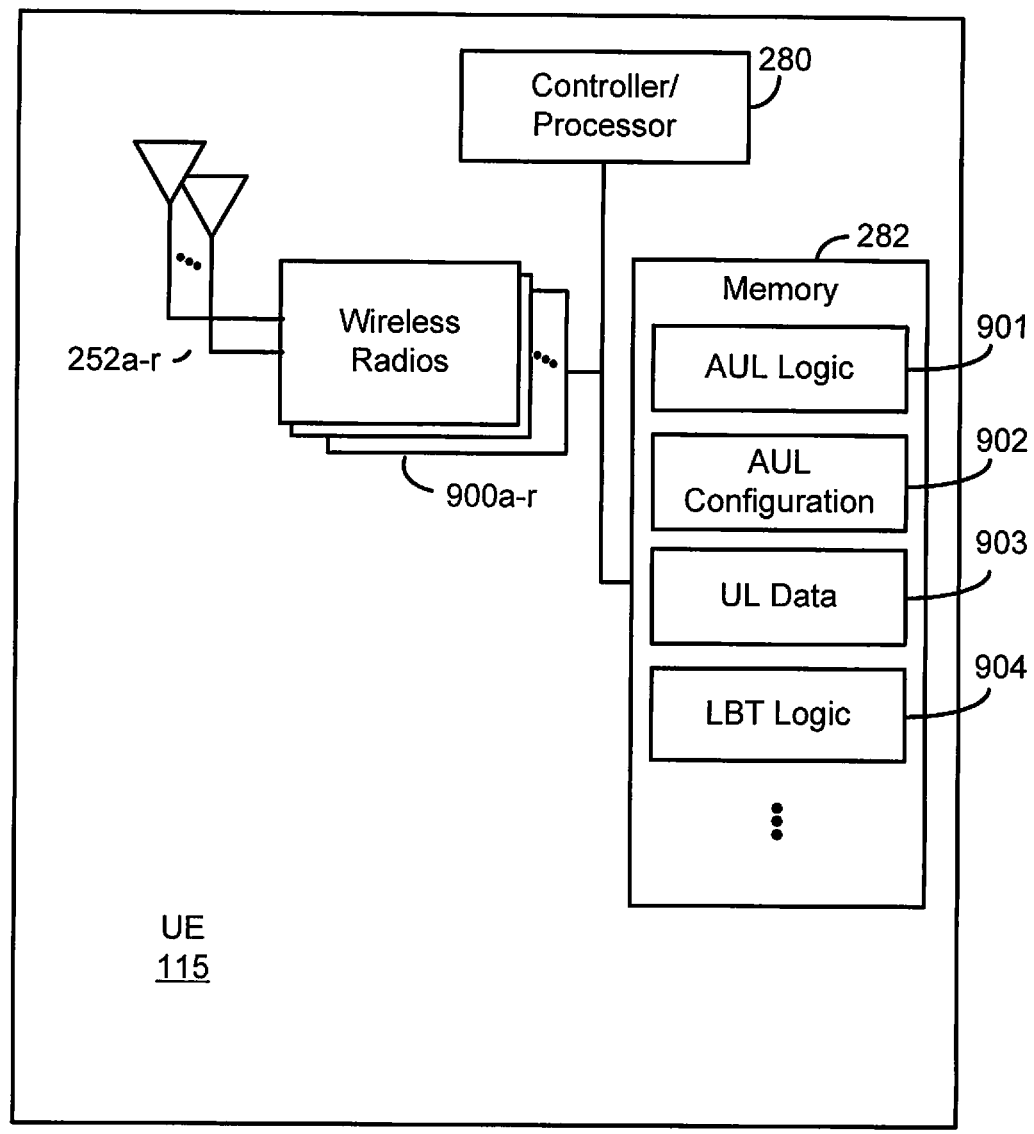
FIG. 9 is a block diagram illustrating a UE configured according to one aspect of the present disclosure.

FIG. 5A is a block diagram illustrating example blocks executed by a UE to implement one aspect of the present disclosure. The example blocks will also be described with respect to UE 115 as illustrated in FIG. 9. FIG. 9 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 900a-r and antennas 252a-r. Wireless radios 900a-r includes various components and hardware, as illustrated in FIG. 2 for UE 115, including modulator/demodulators 254a-r, MIMO detector 256, receive processor 258, transmit processor 264, and TX MIMO processor 266.

At block 500, a UE receives an activation of configured AUL for the UE, wherein the configured AUL includes a plurality of allocated AUL opportunities. A UE, such as UE 115, that has AUL capabilities includes AUL logic 901, stored in memory 282. Under control of controller/processor 280, the execution environment of AUL logic 901 provides the feature and functionality of AUL transmission to UE 115. The functionality of AUL transmission provided within the execution environment of AUL logic 901 includes receiving AUL configuration information from a serving base station, which UE 115, under control of controller/processor 280, stores in memory 282 at AUL configuration 902.

The AUL configuration information identifies multiple AUL opportunity resources across the channel bandwidth at different times. The functionality also includes the activation mechanism which, after the AUL information and parameters are configured with the identification of the AUL opportunities, UE 115 may initiate such AUL capability after receiving an activation signal from the serving base station. According to the various aspects of the present disclosure, while the activation signal activates the AUL capability within UE 115, it is not enabled for transmission by the activation signal for AUL transmission opportunities (TxOPs) that lie outside of the resources reserved for a current base station-initiated TxOP and overlap the timing of the current base station-initiated TxOPs. UE 115 receives such activation signal via antennas 252a-r and wireless radios 900a-r, which processes and signals the execution environment of AUL logic 901 that AUL capabilities are activated.

At block 501, the UE identifies one or more overlapping AUL transmission opportunities (TxOPs) in a shared communication spectrum outside of a set of resources within the shared communication spectrum allocated for a current TxOP of a serving base station. As UE 115 detects sufficient data buffered in memory 282 at uplink data 903, UE 115 may desire to perform AUL transmission at a next available AUL TxOP. UE 115 would access the configuration information in memory 282 at AUL configuration 902 to determine the next available AUL TxOP. According to the illustrated example, UE 115 identifies the next AUL TxOP outside of the resources reserved for the current TxOP reserved by UE 115's serving base station. Within the execution environment of AUL logic 901, UE 115 understands that, while AUL capabilities have been activated, UE 115 is not enabled to transmit at the out-of-TxOP-resources with only an activation of AUL capabilities.

At block 502, the UE determines a status of an enabling indication for the UE, wherein the enabling indication enables AUL transmissions for the UE outside of the set of resources within the current TxOP. Within the execution environment of AUL logic 901, UE 115, under control of controller/processor 280, recognizes that UE 115 must first obtain an enabling indication before it may attempt an AUL transmission at the next out-of-TxOP-resources AUL TxOP. UE 115 would then determine its status, such as whether it has obtained such an enabling indication. According to aspects of the present disclosure, UE 115 may receive an explicit signal constituting an enabling indication from the serving base station. This explicit enabling indication signal may be received via antennas 252a-r and wireless radios 900a-r over the same channel/subband as the configured AUL TxOP, over a primary channel of the serving base station, over a completely separate carrier (e.g., a license assisted access (LAA) licensed carrier) from the serving base station, or even a completely different radio or radio access technology (e.g,. a wake up radio, WiFi signaling, etc.).

According to alternative aspects of the present disclosure, UE 115 may implicitly obtain an enabling indication. In such alternative aspects, various states of UE 115 may imply or deem that UE 115 has obtained such enabling indication. For example, UE 115 may be deemed to have obtained an enabling indication when it has successfully completed an LBT procedure on each channel/subband of the current channel bandwidth. UE 115, under control of controller/processor 280, would execute LBT logic 904. Within the execution environment of LBT logic 904, UE 115 performs an LBT procedure (e.g., ECCA, CCA, etc.) on the channel/subband for each channel/subband of the channel bandwidth. If UE 115 detects success of the LBT procedure for each of the channels/subbands of the entire channel bandwidth, the execution environment of AUL logic 901 determines that UE 115 has been deemed or assumed to have obtained an enabling indication.

In an alternative aspect, UE 115 may be deemed to have obtained the enabling indication where it has successfully completed an LBT procedure according to the LBT configuration received from the serving base station. The serving base station will send LBT configuration information to the served UEs, such as UE 115. This LBT configuration information defines the procedure that UE 115 would follow to secure a set of identified channels/subbands for uplink communication. Thus, by successfully completing the LBT procedure according to this LBT configuration, the execution environment of AUL logic 901 would consider that UE 115 had obtained an enabling indication.

At block 503, the UE performs an AUL transmission via the one or more overlapping AUL TxOPs in response successful determination of the enabling indication. Once UE 115 determines that it has obtained an enabling indication, it may then proceed with AUL transmissions at the next out-of-TxOP-resources AUL TxOP. After successfully completing an LBT procedure on the channel/subband of the AUL TxOP, UE 115, under controller/processor 280, transmits data buffered in memory 282 at UL data 903 via wireless radios 900a-r and antennas 252a-r.

Figure 10:
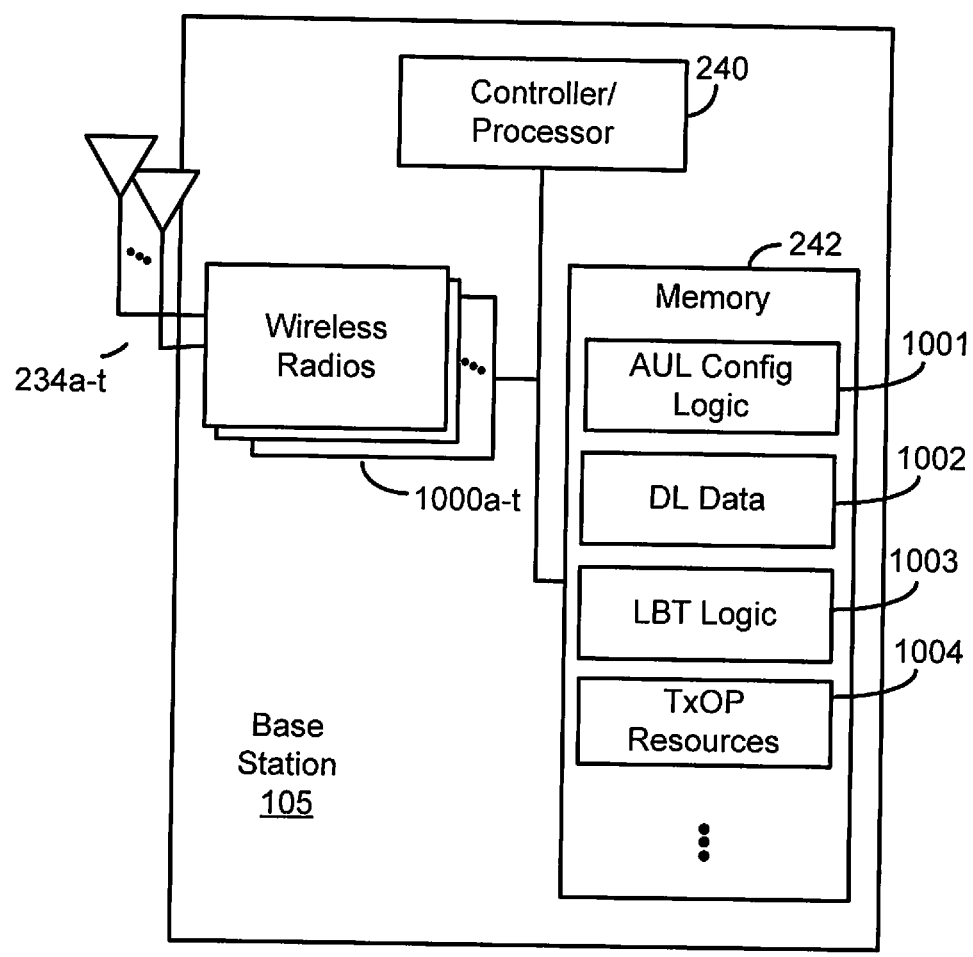
FIG. 10 is a block diagram illustrating a base station configured according to one aspect of the present disclosure.

FIG. 5B is a block diagram illustrating example blocks executed by a base station to implement one aspect of the present disclosure. The example blocks will also be described with respect to base station 105 as illustrated in FIG. 10. FIG. 10 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1000a-t and antennas 234a-t. Wireless radios 1000a-t includes various components and hardware, as illustrated in FIG. 2 for base station 105, including modulator/demodulators 232a-t, MIMO detector 236, receive processor 238, transmit processor 220, and TX MIMO processor 230.

At block 510, a base station transmits an activation signal of configured AUL for one or more served UEs, wherein the configured AUL includes a plurality of allocated AUL TxOPs. In networks that support AUL transmissions, base stations, such base station 105, execute, under control of controller/processor 240, AUL configuration logic 1001, stored in memory 242. The execution environment of AUL configuration logic 1001 provides the features and functionality for providing AUL functionality within the network served by base station 105. The functionality provided includes configuring multiple AUL TxOPs across the channel bandwidth at different times and signaling such configuration information to served UEs via wireless radios 1000a-t and antennas 234a-t. The functionalities provided by the execution environment of AUL configuration logic 1001 further includes the activation mechanism, in which after sending the configuration information for the AUL capabilities, a further activation signal may be sent to various served UEs to activate their AUL capabilities. However, according to the various aspects of the present disclosure, the AUL functionalities provided through execution of AUL configuration logic 1001 further includes an enablement mechanism to enable selected UEs to perform such AUL transmissions. In activating AUL capabilities for various UEs, base station 105 would transmit an activation signal to the UEs via wireless radios 1000a-t and antennas 234a-t.

At block 511, the base station performs an LBT procedure on a set of resources within a shared communication spectrum to secure a current TxOP. When base station 105 determines that it has data buffered in memory 242 at downlink data 1002, base station 105, under control of controller/processor 240, executes LBT logic 1003, stored in memory 242. The execution environment of LBT logic 1003 performs an LBT procedure on the channels/subbands of the channel bandwidth identified for base station 105. Upon detecting success of the LBT procedure, base station 105 identifies a reserved TxOP including the resources of each channel/subband where a successful LBT procedure has occurred. This information may be stored at TxOP resources 1004 in memory 242.

At block 512, the base station signals an enabling indication for the one or more served UEs, wherein the enabling indication enables AUL transmissions outside of the set of resources for the current TxOP, and wherein the AUL transmissions overlap at least a portion of the current TxOP. Within the execution environment of AUL configuration logic 1001, base station 105 knows where each AUL TxOP is located and, relative to the reserved resources of base station 105's TxOP at TxOP resources 1004, base station 105 can identify AUL TxOPs that are out-of-TxOP-resources. The functionality provided by with the execution environment of AUL configuration logic 1001 may determine whether AUL transmissions at the next location that overlaps the current TxOP, but which are outside of the current TxOP resources would cause too much interference or be interfered with by other scheduled signaling. Where base station 105, within the execution environment of AUL configuration logic 1001, determines that transmissions for some UEs may be acceptable for this out-of-TxOP-resource AUL TxOP, the execution environment of AUL configuration logic 1001 may, in certain aspects of the present disclosure, trigger transmission of the enabling indication via wireless radios 1000a-r and antennas 234a-t to the identified UEs.

It should be noted that in alternative aspects of the present disclosure, in which the enabling indication may be implicitly obtained by a UE, base station 105 may include such conditions where enablement may be deemed in signaling of the AUL configuration information. In other, still alternative aspects, the conditions for deeming enablement may be pre-existing at the UE.

At block 513, the base station receives one or more AUL transmissions during the current TxOP via one or more AUL TxOPs outside of the set of resources. When base station 105 determines, within the execution environment of AUL configuration logic 1001 and under control of controller/processor 240, that particular UEs may be able to transmit at a next AUL TxOP that overlaps the current TxOP duration, but is located outside of the resources reserved by base station 105 for the current TxOP, it may then receive one or more AUL transmissions as these enabled UEs begin to transmit data autonomously at the AUL TxOP. Base station 105 would receive such AUL transmissions via antennas 234a-t and wireless radios 1000a-t.

Figure 6:
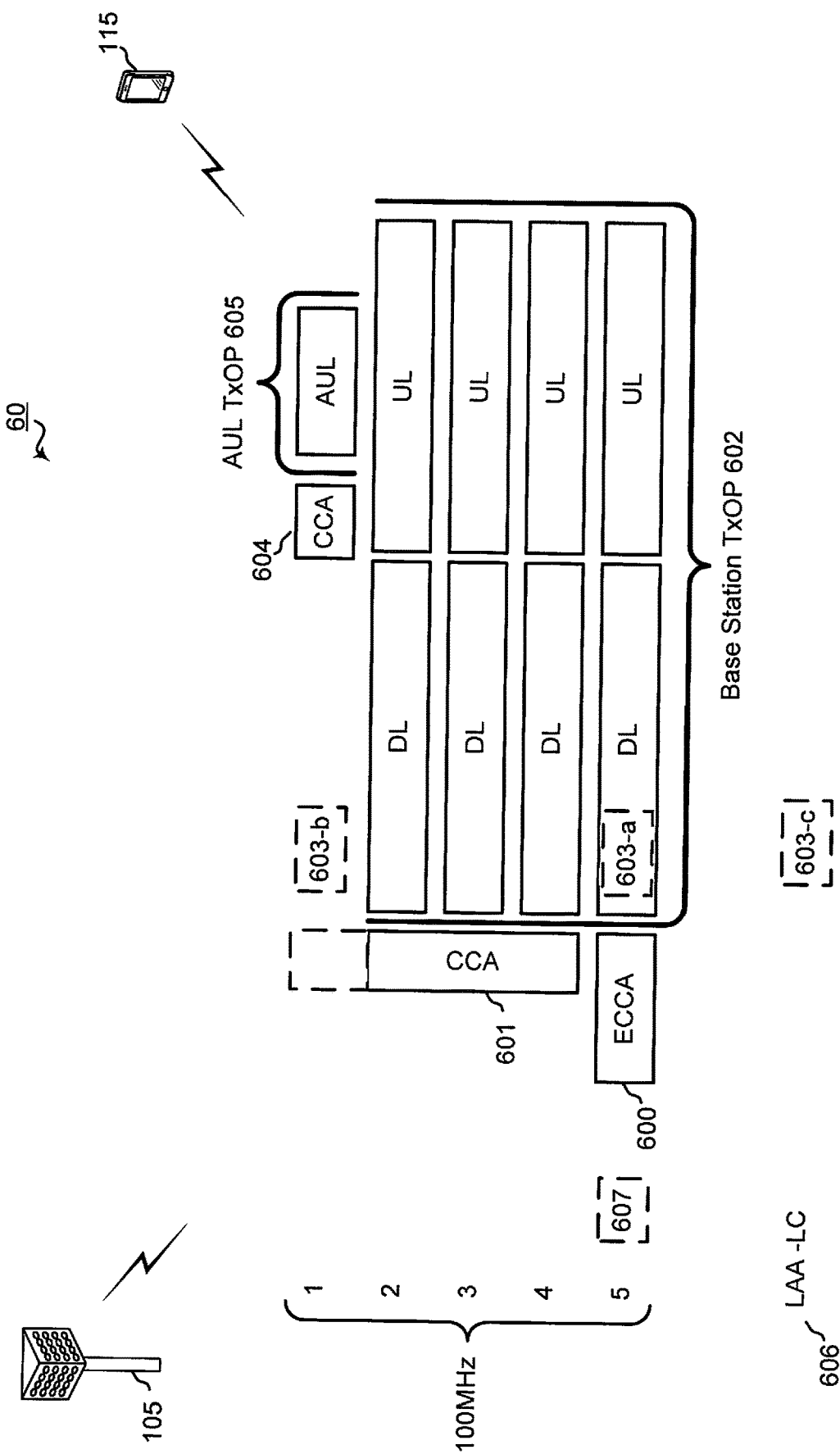
FIG. 6 is a block diagram illustrating an NR-U network having a base station and UE configured according to one aspect of the present disclosure.

FIG. 6 is a block diagram illustrating an NR-U network 60 having a base station 105 and UE 115 configured according to one aspect of the present disclosure. The illustrated portion of NR-U network 60 provides a 100 MHz channel bandwidth of shared communication spectrum for base station 105 communications. The 100 MHz channel bandwidth is divided into five 20 MHz subbands (subbands 1-5). AUL opportunities have been configured, communicated to, and activated for UE 115 (not shown). As illustrated, base station 105 intends to participate in communications and performs ECCA 600 on its primary channel (subband 5) and performs CCA 601 on subbands 1-4. Base station 105 reserves TxOP 602 upon detection of success of ECCA 600 and CCA 601. With CCA 601 successful only on subbands 2-4, TxOP 602 reserves resources on subbands 2-5 for the duration of TxOP 602.

Within the duration of TxOP 602, an AUL opportunity has been configured, AUL TxOP 605.

According to aspects of the present disclosure, an AUL opportunity configured outside of the resources of TxOP 602 which overlaps the duration of TxOP 602 may be enabled for a UE, such as UE 115, when UE 115 obtains an enabling indication from its serving base station, base station 105. In the absence of such an enabling indication, UE 115 would only be allowed to use any configured overlapping AUL opportunities that resided within the same resources of TxOP 602 (e.g., within the duration of TxOP 602 on any of subbands 2-5). Such an absence of an enabling indication would mean that all "out-of-TxOP-resource" AUL opportunities have been suspended. For purposes of this disclosure, "out-of-TxOP-resource" AUL refers to an AUL opportunity that has been configured outside of the reserved resources of the base station TxOP, such as TxOP 602, which also overlaps the duration of the base station TxOP. While the lack of enabling indicator indicates a suspension of such out-of-TxOP-resource AUL, AUL may still be activated for UE 115.

As illustrated in FIG. 6, the enabling indication from base station 105 comprises an explicit signaling, enabling indication 603. In a first optional example aspect, base station 105 may transmit enabling indication 603-a in-band at subband 5, such as via a common signaling means (e.g., within a special group common-PDCCH (gc-PDCCH)) in the current TxOP, TxOP 602. In such an example implementation, the AUL UE, UE 115, may search or decode the common signaling on a component carrier/subband (subband 5) that is different from the component carrier/subband on which AUL TxOP 605 is configured (subband 1). In a second optional example aspect, base station 105 may transmit enabling indication 603-b on the same component carrier/subband on which AUL TxOP 605 is configured (subband 1). In a third optional example aspect, base station 105 may transmit enabling indication 605-c via a different carrier, such as LAA licensed carrier (LAA-LC) 606, which is available to base station 105.

It should be noted that in additional aspects of the present disclosure, enabling indication 603 may be sent via a completely different radio network or radio access technology (e.g., a wake-up radio).

In an additional aspect of the present disclosure, as illustrated in FIG. 6, base station 105 can explicitly synchronize its primary LBT channel (subband 5) with UE 115. Synchronization signal 607, transmitted on subband 5, identifies to UE 115 the primary LBT channel (subband 5) of base station 105. Base station 105 would then transmit enabling indication 603-a via the common signaling (e.g., gc-PDCCH) on the synchronized primary LBT channel (subband 5). Synchronization signal 607 may be transmitted using various signaling, such as RRC signaling, MAC control element (CE), DCI, or the like.

It should be noted that, the primary LBT channel can be implicitly specified through configuration of out-of-TxOP-resource AUL opportunity locations in a 20 MHz NR-U cell. Thus, UE 115 may rely on a full LBT procedure without reading the common signaling of the enabling indication (e.g, special gc-PDCCH). With the primary LBT channel (20 MHz) identified or synchronized with UE 115, the out-of-TxOP resource AUL opportunities can be configured or activated on the primary LBT channel while AUL opportunities located within the base station TxOP resources may occur anywhere within the channel bandwidth of base station 105.

Figure 7:
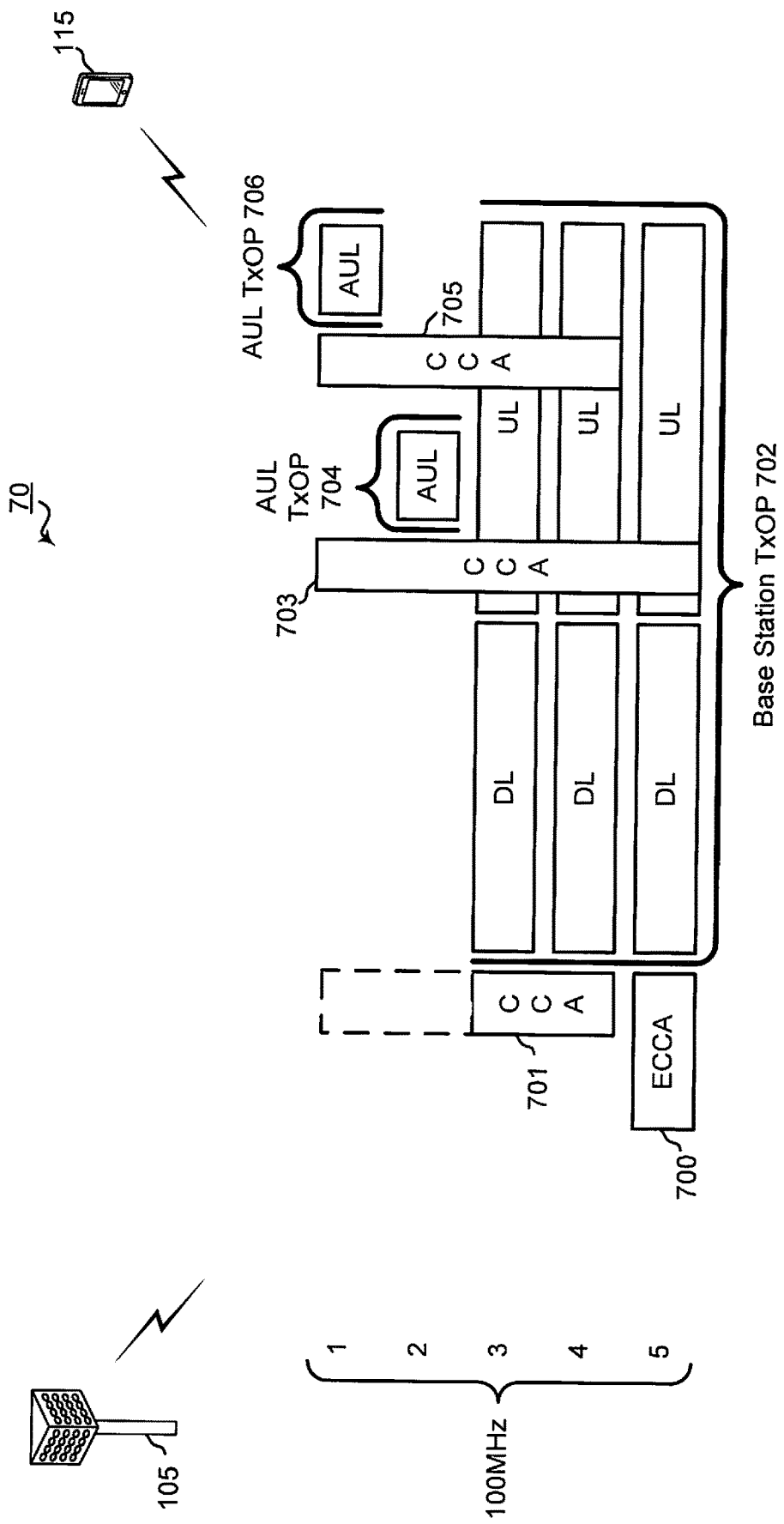
FIG. 7 is a block diagram illustrating an NR-U network having a base station and UE configured according to one aspect of the present disclosure.

FIG. 7 is a block diagram illustrating an NR-U network 70 having a base station 105 and UE 115 configured according to one aspect of the present disclosure. The illustrated portion of NR-U network 70 provides a 100 MHz channel bandwidth that is divided into five 20 MHz subbands (subbands 1-5). As illustrated, base station 105 intends to participate in communications and performs ECCA 700 on its primary channel (subband 5) and performs CCA 701 on subbands 1-4. Base station 105 reserves TxOP 702 upon detection of success of ECCA 700 and CCA 701. With CCA 601 successful on subbands 3 and 4, TxOP 602 reserves resources on subbands 3-5 for the duration of TxOP 602. AUL opportunities have been configured on subbands 1 and 2, which overlap the duration of TxOP 702.

According to the illustrated aspect, the enabling indication may be an implicit indication. For example, AUL UE, such as UE 115, can be regarded as having received the enabling indication when it has successfully conducted LBT on all component channels/sub-bands within the channel bandwidth of base station 105. UE 115 successfully performs CCA 703 on the entire channel bandwidth (subbands 1-5). The success of CCA 703 implicitly indicates that UE 115 has received an enabling indication, which enables UE 115 for transmissions on subband 2 at AUL TxOP 704.

In an additional aspect illustrated at FIG. 7, UE 115 may be regard to have received the enabling indication when it has successfully conducted an LBT procedure according to the LBT configuration signaled to UE 115 by base station 105. The LBT configuration signaled by base station 105 identifies LBT procedures to be performed on subbands 1-4. By successfully completing CCA 705 according to the LBT configuration on subbands 1-4, UE 115 is implicitly considered to have received an enabling indication, which enables UE 115 to transmit at AUL TxOP 706 in subband 1.

Figure 8:
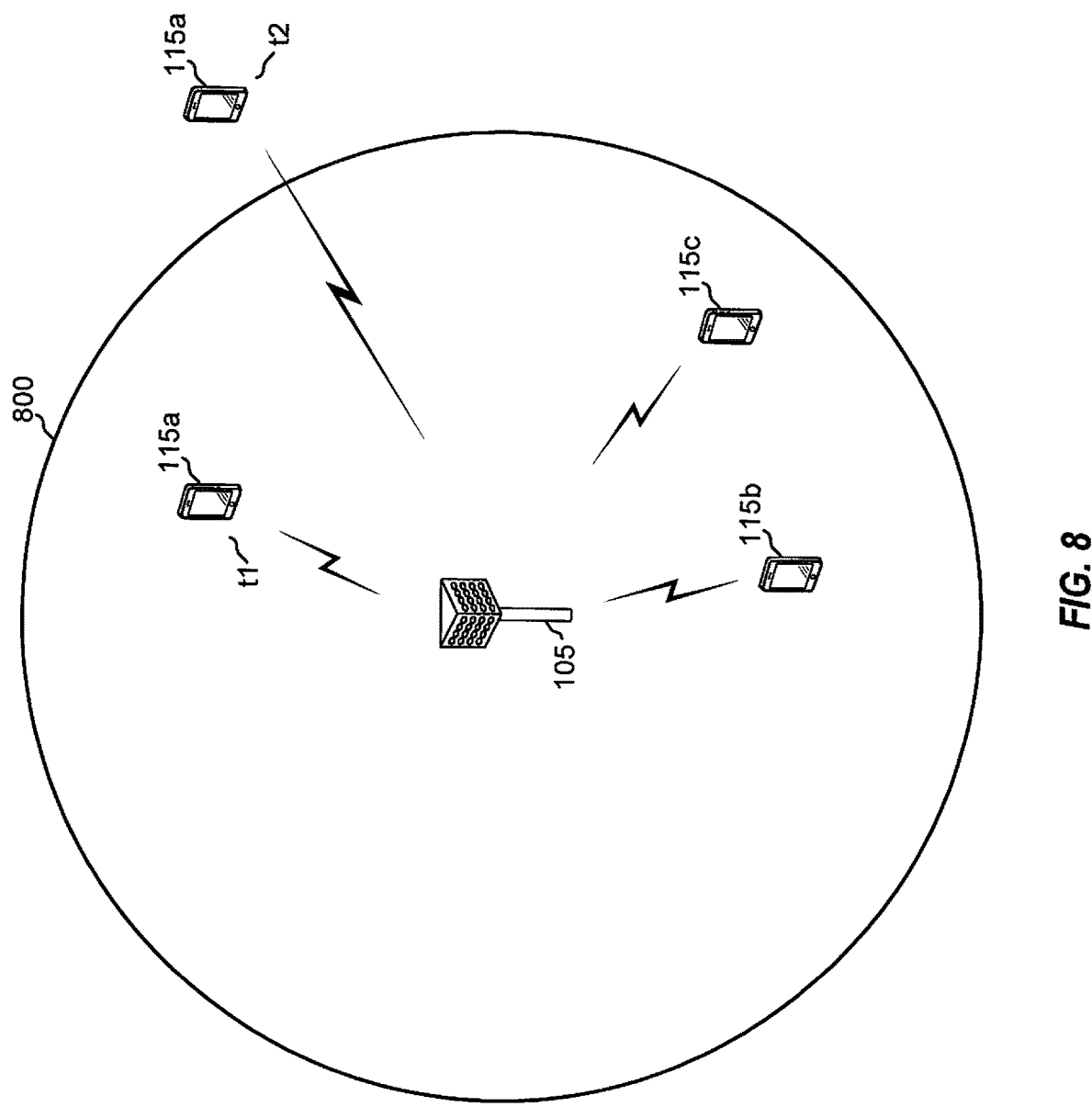
FIG. 8 is a block diagram illustrating a base station and UEs, each configured according to one aspect of the present disclosure.

FIG. 8 is a block diagram illustrating a base station 105 and UEs 105a-105c, each configured according to one aspect of the present disclosure. Base station 105 serves each of UEs 105a-105c using shared communication spectrum.

Various AUL opportunities may be configured at multiple locations and resources available within the shared communication spectrum. During preparation for communications, base station 105 may secure a portion of its identified channel bandwidth for a base station TxOP. Attention may be directed for operating AUL with UEs that may not be within the same ED-based collision field with their serving base station. A UE may be considered not within the same ED-based collision field as its serving base station when the path loss between the base station and the UE is so large that transmissions from the UE may not prevent the base station from successfully securing the TxOP based only on an ED LBT. In other words, the base station could not safely begin to compete for a TxOP using only ED LBT without either reactively conducting AUL preamble detection (PD) in parallel to the ED LBT, where any detected AUL would trigger a "busy" channel LBT failure, or proactively/artificially identify the ED LBT as "busy" around any instant an AUL opportunity may occur.

As illustrated in FIG. 8, UEs within ED collision field 800 are located within the same ED-based collision field as base station 105. Base station 105 can compete for a TxOP in a non-proactive manner without effectively backing-off around configured AUL opportunities when all configured AUL UEs are within ED collision field 800. Thus, base station 105 may attempt detection of an AUL preamble during any AUL TxOPs when UE 115*b* and 115*c* are within ED collision field 800, along with UE 115*a* at time, t1. At time, t2, UE 115*a* moves outside of ED collision field 800. According to the illustrated aspect, when UE 115*a* has an activated AUL and moves outside of ED collision field 800, UE 115*a* transmits a report to base station 105 (e.g., radio resource management (RRM) report). Base station 105 can compete for a TxOP in the non-proactive way when enhanced with AUL detection capabilities by defining an easy-to-detect preamble/initial signal for AUL TxOP transmissions.

It should be noted that such an AUL TxOP preamble/initial signal may be configured differently from that of a preamble/initial signal of a base station TxOP. For example, where UE 115*b* secures an AUL TxOP during a TxOP initiated by base station 105, UEs 115*b* and 115*a*, at time, t1, detect the AUL TxOP preamble/initial signal, UEs 115*a* and 115*b* may conduct a micro-sleep during its duration.

It should further be noted that the AUL TxOP preamble/initial signal may not be UE-specific in order to ease the detection ability of base station 105.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5A and 5B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, by a user equipment (UE), an activation of configured autonomous uplink (AUL) for the UE, wherein the configured AUL includes a plurality of allocated AUL opportunities;
   identifying, by the UE, one or more overlapping AUL transmission opportunities (TxOPs) in a shared communication spectrum outside of a set of resources within the shared communication spectrum allocated for a current TxOP of a serving base station, wherein the one or more overlapping AUL transmission opportunities overlap the current TxOP of the serving base station;
   determining, by the UE, a status of an enabling indication for the UE, wherein the enabling indication enables AUL transmissions for the UE outside of the set of resources within the current TxOP; and
   performing, by the UE, an AUL transmission via the one or more overlapping AUL TxOPs in response successful determination of the enabling indication.

2. The method of claim 1, wherein the determining the status of the enabling indication includes receiving the enabling indication from a serving base station via one of: the shared communication spectrum, a licensed non-contention communication channel between the UE and the serving base station, or an alternative radio resource available to the UE.

3. The method of claim 2, wherein the receiving the enabling indication from the serving base station includes receiving the enabling indication from the serving base station in a group common control signal associated with the current TxOP.

4. The method of claim 2, further including:
   determining, by the UE, an identification of a current primary LBT channel of the serving base station, wherein the enabling indication is subsequently received from the serving base station via the current primary LBT channel.

5. The method of claim 4, wherein the determining the identification includes one of:
   receiving, by the UE from the serving base station, the identification of the current primary LBT channel, or
   determining, by the UE, the identification from an AUL configuration message including reference to the current primary LBT channel associated with the one or more overlapping AUL TxOPs.

6. The method of claim 4, wherein the activation activates the one or more overlapping AUL TxOPs on the current primary LBT channel.

7. The method of claim 1, wherein the determining the status of the enabling indication includes determining the status as one of:
   successful listen before talk (LBT) procedure for each LBT resource within a channel bandwidth allocated to a serving base station; or
   successful LBT procedure according to an LBT configuration received from the serving base station.

8. The method of claim 1, further including:
   detecting, by the UE, a location outside of an energy detection collision field of the serving base station; and
   transmitting, by the UE, a resource report to the serving base station identifying that the UE is outside of the energy detection collision field.

9. The method of claim 1, wherein the performing the AUL transmission includes:
   performing, by the UE, a listen before talk (LBT) procedure on the one or more overlapping AUL TxOPs;
   identifying, by the UE, an AUL TxOP in response to success of the LBT procedure;
   transmitting, by the UE, a preamble signal identifying the AUL TxOP, wherein the preamble signal is different than a TxOP preamble signal associated with a base station-initiated TxOP; and
   transmitting, by the UE, uplink data identified for the AUL transmission.

10. The method of claim 9, wherein the preamble signal does not identify the UE.

11. The method of claim 1, further including:
    detecting, by the UE, a preamble signal identifying an AUL TxOP associated with another UE; and
    performing, by the UE, a micro-sleep state for a duration of the AUL TxOP identified in the preamble signal.

12. A method of wireless communication, comprising:
    transmitting, by a base station, an activation signal of configured autonomous uplink (AUL) for one or more served user equipments (UEs), wherein the configured AUL includes a plurality of allocated AUL transmission opportunities (TxOPs);
    performing, by the base station, a listen before talk (LBT) procedure on a set of resources within a shared communication spectrum to secure a current TxOP;
    signaling, by the base station, an enabling indication for the one or more served UEs, wherein the enabling indication enables AUL transmissions outside of the set of resources for the current TxOP, and wherein the AUL transmissions overlap at least a portion of the current TxOP; and
    receiving, by the base station, one or more AUL transmissions during the current TxOP via one or more AUL TxOPs outside of the set of resources.

13. The method of claim 12, wherein the signaling the enabling indication includes transmitting the enabling indication via one of:
   the shared communication spectrum,
   a licensed non-contention communication channel between the base station and the served UE, or
   an alternative radio resource available to the base station.

14. The method of claim 13, wherein the signaling the enabling includes transmitting the enabling indication in a group common control signal associated with the current TxOP.

15. The method of claim 12, further including:
   signaling, by the base station, an identification of a current primary LBT channel to the one or more served UEs, wherein the enabling indication is subsequently transmitted to the served UE via the current primary LBT channel.

16. The method of claim 15, wherein the identification includes one of:
   an identification signal identifying the current primary LBT channel, or
   an AUL configuration message including reference to the current primary LBT channel associated with the one or more available AUL opportunity resources.

17. The method of claim 15, wherein the activation signal activates the one or more AUL TxOPs on the current primary LBT channel.

18. The method of claim 12, further including:
   determining, by the base station, that the one or more served UEs are located with a same energy detection collision field as the base station, wherein the performing the LBT procedure is in response to the determining.

19. The method of claim 12, wherein the performing the LBT procedure includes:
   performing energy detection for signals occupying the set of resources;
   performing preamble detection for an AUL preamble signal; and
   securing the current TxOP in response to successfully failing to detect the signals in the energy detection and successfully failing to detect the AUL preamble signal in the preamble detection.

20. The method of claim 19, wherein the AUL preamble signal is different than a base station-initiated TxOP preamble signal.

21. The method of claim 19, wherein the AUL preamble signal does not identify a UE from which the AUL preamble signal is transmitted.

22. An apparatus configured for wireless communication, the apparatus comprising:
   at least one processor; and
   a memory coupled to the at least one processor,
   wherein the at least one processor is configured:
      to receive, by a user equipment (UE), an activation of configured autonomous uplink (AUL) for the UE, wherein the configured AUL includes a plurality of allocated AUL opportunities;
      to identify, by the UE, one or more overlapping AUL transmission opportunities (TxOPs) in a shared communication spectrum outside of a set of resources within the shared communication spectrum allocated for a current TxOP of a serving base station, wherein the one or more overlapping AUL transmission opportunities overlap the current TxOP of the serving base station;
      to determine, by the UE, a status of an enabling indication for the UE, wherein the enabling indication enables AUL transmissions for the UE outside of the set of resources within the current TxOP; and
      to perform, by the UE, an AUL transmission via the one or more overlapping AUL TxOPs in response successful determination of the enabling indication.

23. The apparatus of claim 22, wherein the configuration of the at least one processor to determine the status of the enabling indication includes configuration to receive the enabling indication from a serving base station via one of: the shared communication spectrum, a licensed non-contention communication channel between the UE and the serving base station, or an alternative radio resource available to the UE.

24. The apparatus of claim 22, wherein the configuration of the at least one processor to determine the status of the enabling indication includes configuration to determine the status as one of:
   successful listen before talk (LBT) procedure for each LBT resource within a channel bandwidth allocated to a serving base station; or
   successful LBT procedure according to an LBT configuration received from the serving base station.

25. The apparatus of claim 22, further including configuration of the at least one processor:
   to detect, by the UE, a location outside of an energy detection collision field of the serving base station; and
   to transmit, by the UE, a resource report to the serving base station identifying that the UE is outside of the energy detection collision field.

26. The apparatus of claim 22, wherein the configuration of the at least one processor to perform the AUL transmission includes configuration of the at least one processor:
   to perform, by the UE, a listen before talk (LBT) procedure on the one or more overlapping AUL TxOPs;
   to identify, by the UE, an AUL TxOP in response to success of the LBT procedure;
   to transmit, by the UE, a preamble signal identifying the AUL TxOP, wherein the preamble signal is different than a TxOP preamble signal associated with a base station-initiated TxOP; and
   to transmit, by the UE, uplink data identified for the AUL transmission.

27. An apparatus configured for wireless communication, the apparatus comprising:
   at least one processor; and
   a memory coupled to the at least one processor,
   wherein the at least one processor is configured:
      to transmit, by a base station, an activation signal of configured autonomous uplink (AUL) for one or more served user equipments (UEs), wherein the configured AUL includes a plurality of allocated AUL transmission opportunities (TxOPs);
      to perform, by the base station, a listen before talk (LBT) procedure on a set of resources within a shared communication spectrum to secure a current TxOP;
      to signal, by the base station, an enabling indication for the one or more served UEs, wherein the enabling indication enables AUL transmissions outside of the set of resources for the current TxOP, and wherein the AUL transmissions overlap at least a portion of the current TxOP; and
      to receive, by the base station, one or more AUL transmissions during the current TxOP via one or more AUL TxOPs outside of the set of resources.

28. The apparatus of claim 27, wherein the configuration of the at least one processor to signal the enabling indication includes configuration to transmit the enabling indication via one of:
- the shared communication spectrum,
- a licensed non-contention communication channel between the base station and the served UE, or
- an alternative radio resource available to the base station.

29. The apparatus of claim 27, further including configuration of the at least one processor to signal, by the base station, an identification of a current primary LBT channel to the one or more served UEs, wherein the enabling indication is subsequently transmitted to the served UE via the current primary LBT channel.

30. The apparatus of claim 27, further including configuration of the at least one processor to determine, by the base station, that the one or more served UEs are located with a same energy detection collision field as the base station, wherein the configuration of the at least one processor to perform the LBT procedure is executed in response to the configuration of the at least one processor to determine.

* * * * *